UNITED STATES PATENT OFFICE.

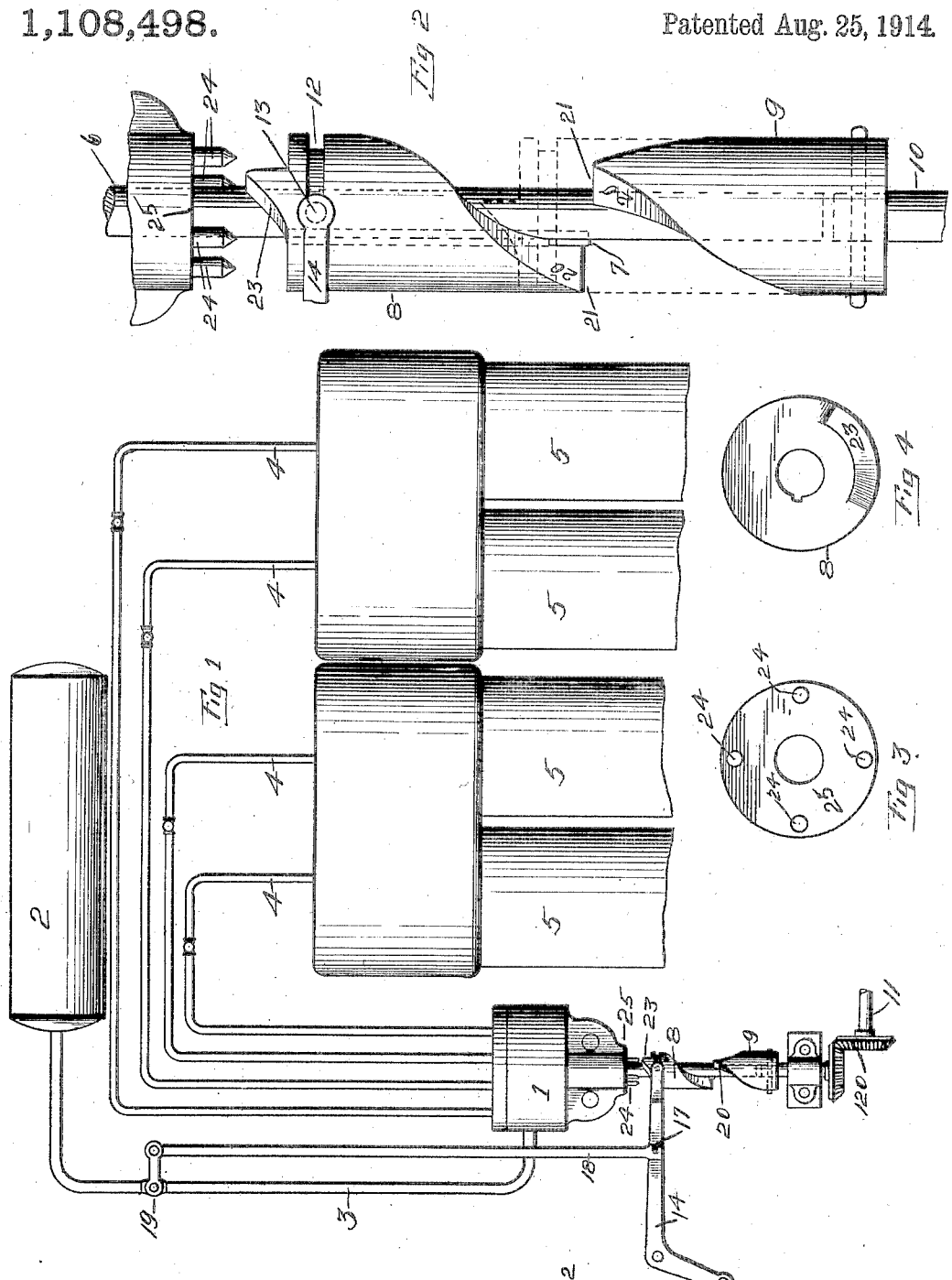

SAMUEL HOWARD HEGINBOTTOM, FRANK H. HEGINBOTTOM, AND BERT W. HEGINBOTTOM, OF SAGINAW, MICHIGAN.

STARTING DEVICE FOR EXPLOSIVE-ENGINES.

1,108,498.  Specification of Letters Patent.  Patented Aug. 25, 1914.

Application filed July 23, 1912. Serial No. 711,761.

*To all whom it may concern:*

Be it known that we, SAMUEL H. HEGINBOTTOM, FRANK H. HEGINBOTTOM, and BERT W. HEGINBOTTOM, citizens of the United States, residing at Saginaw, in the county of Saginaw, State of Michigan, have invented certain new and useful Improvements in Starting Devices for Explosive-Engines, of which the following is a description, reference being had to the accompanying drawings, forming a part hereof.

Our invention relates to improvements in compressed air starting devices for internal combustion engines and has for its object to provide a construction whereby the starting mechanism may be disengaged after the engine has been started.

Another object of the invention is to provide means whereby the engine may be reversed for a portion of a stroke and then restarted. This is of importance when the engine fails to gain sufficient momentum on admitting the air and is likely to occur when the engine has stopped on or near the completion of an expansion stroke of a piston.

The invention further relates to that class of starting devices which introduce gas under pressure into the cylinder of an internal combustion engine and by suitable means explode the said gas and so start the engine.

In the drawing Figure 1 is a view in elevation of our device showing the starting means disengaged. Fig. 2 is an enlarged view of the engaging and disengaging means hereinafter referred to as the clutch. Fig. 3 is a plan view of the lower edge of the distributer bearing. Fig. 4 is a plan view of the top of the upper clutch member.

Referring to the drawing, the controlling or distributing valve 1 is of the usual construction, and serves to time and distribute the air under pressure from the tank 2, pipe 3, into the various pipes 4, and thence into the cylinders 5, it being understood that by this distributing device, air pressure is admitted to a cylinder during the expansion stroke of the piston.

The shaft 6 is fastened to and actuates the distributing valve 1; said shaft is provided near its lower end with a groove, and a key or feather 7 is fastened securely therein. Key 7 allows the upper clutch member 8 to slide along the shaft 6 and serves as an attaching means between the said clutch member and shaft.

Fastened securely to shaft 10 is the lower part of the engaging means, clutch member 9, which is rotated by the shaft 10, which in turn, through the intervention of gears 120, is rotated by the shaft 11. Shaft 11 may be an extension of the cam shaft or a special shaft, and is rotated at cam shaft speed.

The clutch member 8 is provided near its upper end with a groove, or slot, 12 adapted to be engaged by the pins 13, which are located at the extremities of a bell crank lever 14, a link 15 serves to connect the said bell crank lever 14 to a controlling lever 16. Upon the lever 14 is attached a pin 17 adapted to engage a rod 18 which controls a valve 19, said valve controlling the air supply from tank 2. The upper and lower portions 8 and 9 of the engaging means of the clutch are shown more fully in Fig. 2 are provided with spiral cut faces 20, each member having two such spirals radiating from a common line 21. The line 21 taken in connection with spiral faces 20 has the form or shape of a wedge. The clutch member 8 is further provided upon its top surface with a beveled tooth 23, said tooth acts in conjunction with the pins 24, said pins being rigidly mounted on the lower edge of the bearing No. 25, there being as many pins as there are cylinders to the engine. Lowering member 8 into engagement with member 9 would tend to turn the member 8 and also the shaft 7 through 180 degrees or one-half revolution as more clearly shown in Fig. 2.

Having thus pointed out the special features of the device, its operation may be described as follows: Starting as in Fig. 1 with the clutching members 8 and 9 disengaged and the valve 19 closed, and the engine stationary, in order to start the engine the handle 16 is moved to the right which acting through the system of levers hereinbefore described lowers the clutch member 8 into engagement with clutch member 9 and at the same time opens the air supply valve 19 in the air supply pipe 3. The air is admitted to a cylinder during the expansion stroke of its piston by the distributing valve 1 and thus starts the engine, the engine thus revolving until it begins to run under the action of its own fuel. At such time the handle 16 is turned to the left and the clutch member 8 is disengaged from the clutch member 9. It will thus be seen that although the shaft 11, shaft 10 and clutch member 9 continue to revolve with the engine the rest of the starting apparatus remains stationary. Considering now the case when the engine has stopped at or near the completion of its expansion stroke of one of the pistons, air is admitted but the engine moves forward only until the distributing valve closes and the engine does not start. In this case the lever 16 is moved to the left to its extreme position, thus causing clutch member 8 to move up and out of engagement with the clutch member 9 and causes the beveled tooth No. 23 to be forced against the pin 24, thus causing the clutch member 8 to revolve thereby rotating the shaft 6, and also the distributing valve 1, which thereby opens the distributing valve and admits air to a cylinder whose piston is on its compression stroke. This causes the engine to move backward to the beginning of the compression stroke, which is also the beginning of the expansion stroke of a different cylinder, and as will be seen is an advantageous position for starting when using compressed air.

By providing the lever 16 with a rack 22 the clutch member 8 may be held in any one of the three positions of engagement. We do not wish to limit ourselves, however, to that class of starters which use compressed air, for our device is equally operated with, and may be applied to, those which introduce gas under pressure to a cylinder and then explode the gas, our device in this case being of substantially the same construction as described.

Having thus described our device what we claim as our invention and desire to secure by Letters Patent is:

1. In a starting device for internal combustion engines the combination of a distributing valve, means for manually rotating said distributing valve, means for mechanically rotating the same, and means for connecting and disconnecting the distributing valve with both of said rotating means.

2. In a starting device for internal combustion engines the combination of a compressed air supply, a distributing valve adapted to distribute compressed air to the cylinders, means for mechanically rotating said distributing valve, means for manually rotating said distributing valve and means for connecting and disconnecting the distributing valve with both of said rotating means.

3. In a starting device for internal combustion engines the combination of a compressed air supply, a distributing valve adapted to distribute compressed air to the cylinders, means for mechanically rotating said distributing valve, means for manually rotating said distributing valve, and means for connecting and disconnecting the distributing valve with said rotating means; and a valve for controlling the supply of compressed air to the distributing valve, said controlling valve operated by the said connecting and disconnecting means.

4. In a starting device for internal combustion engines the combination of a compressed air supply, a distributing valve adapted to distribute compressed air to the cylinders, means for mechanically rotating said distributing valve, means for manually rotating said distributing valve, and means for connecting and disconnecting the distributing valve with said rotating means, and a valve for controlling the supply of compressed air to the distributing valve and connected to said manually rotating means.

5. In a compressed air starting device for internal combustion engines, the combination of a compressed air supply, a distributing valve adapted to distribute compressed air to the cylinders, a driving shaft for rotating said distributing valve, means whereby said distributing valve may be rotated for a portion of a turn in a reverse direction independently of said driving shaft and means for connecting and disconnecting the distributing valve with said driving shaft.

6. In a compressed air starting device for internal combustion engines, the combination of a distributing valve, a shaft for rotating said valve, a clutch composed of upper and lower members, said upper clutch member provided upon its upper surface with a beveled tooth, a series of pins arranged concentrically around said shaft and mounted stationary upon a bracket, said pins adapted to act in conjunction with said bevel tooth, said lower clutch member mounted upon a shaft and rotated therewith, means for raising and lowering said upper clutch member to thereby connect and disconnect it with said lower clutch member and further, to force it against said pins.

This specification signed and witnessed this 9th day of May A. D. 1912.

SAMUEL HOWARD HEGINBOTTOM.
FRANK H. HEGINBOTTOM.
BERT W. HEGINBOTTOM.

In the presence of—
JOHN F. O'KEEFE,
ELSIE F. BERGNER.